United States Patent
Toft

[11] 3,751,199
[45] Aug. 7, 1973

[54] PRESSURE KILN SEAL

[75] Inventor: Luke Alexander Toft, Swansea, Wales

[73] Assignee: The International Nickel Company, Inc., New York, N.Y.

[22] Filed: May 31, 1972

[21] Appl. No.: 258,397

[30] Foreign Application Priority Data
June 2, 1971 Great Britain.................. 18,662/71

[52] U.S. Cl.................................. 432/115, 34/242
[51] Int. Cl.............................................. F27b 7/24
[58] Field of Search....................... 432/115; 34/242

[56] References Cited
UNITED STATES PATENTS
1,998,492  4/1935  Christensen........................ 432/115
3,043,019  7/1962  Steimel............................. 34/242 X Primary Examiner—John J. Camby
Attorney—Ewan C. MacQueen et al.

[57] ABSTRACT

A rotary kiln having a metal-to-metal seal between its rotary and stationary parts is provided with means for preventing the outward passage of dust-laden gas from the kiln into the gap between the mating surfaces of the seal.

2 Claims, 3 Drawing Figures

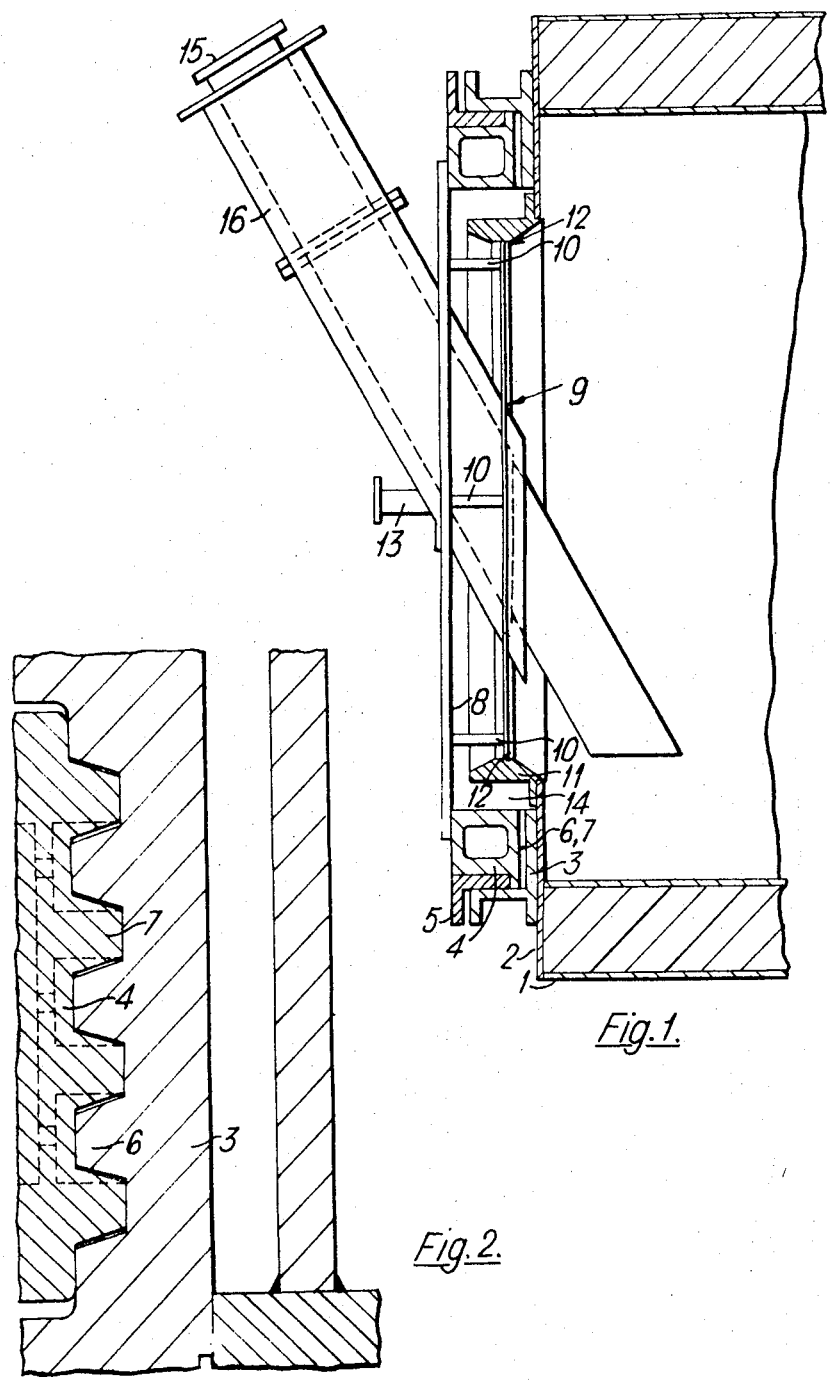

PRESSURE KILN SEAL

In some rotary kilns it is important to provide a gas-tight seal between the rotary structure and a stationary end structure, in order for example to prevent the escape of reacting gas from the kiln.

Excellent seals can be made by metal-to-metal contact, particularly if these are of the labyrinth type in which concentric rings of teeth on the stationary structure mesh with complementary rings of teeth on the end of the rotary structure. However, extremely accurate machining and fitting are required if any such metal-to-metal seal is to be absolutely gas-tight. Now dust is produced from the charge in nearly all rotary kilns, and if this comes between the mating metal surfaces the seal is damaged and the complimentary parts may seize up.

According to the invention a metal-to-metal seal is enclosed in a chamber having moving and stationary walls between which there is an annular gap leading to the interior of the kiln, and means are provided for delivering a stream of gas into the chamber to pass from it into the kiln through the gap, thereby preventing the outward passage of dust-laden gas.

The preferred construction is shown in the accompanying drawings, in which

FIG. 1 is an axial section through one end of the kiln;

FIG. 2 is a section through part of the seal on a larger scale; and

Figure 3:
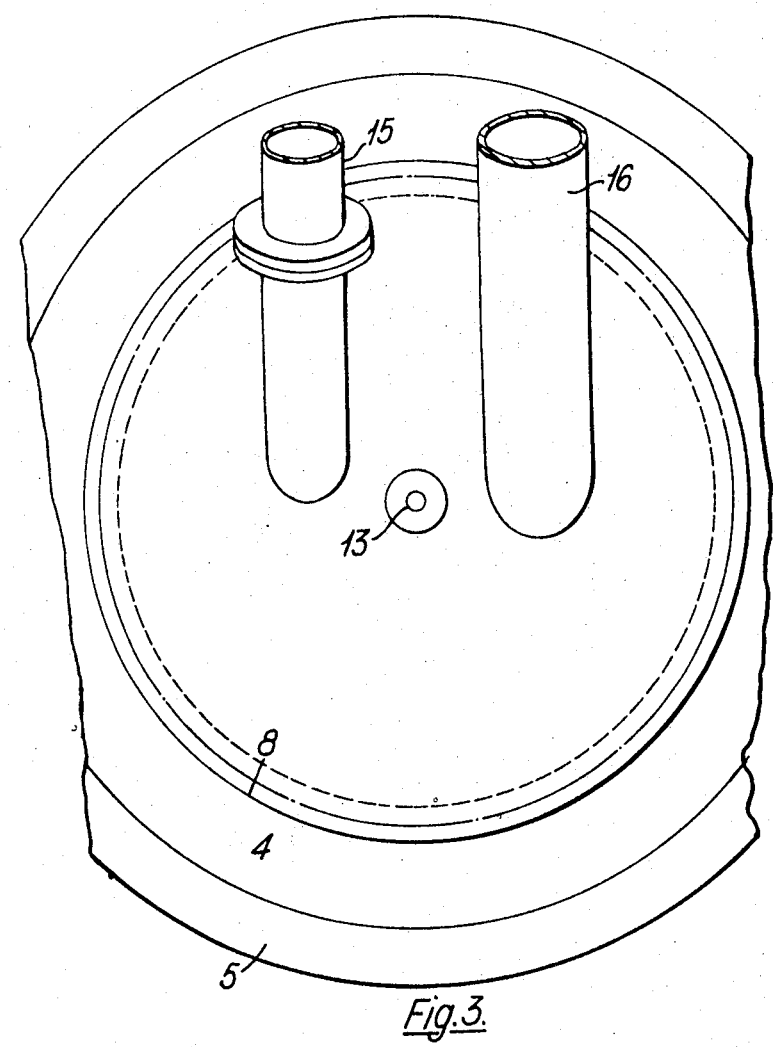
FIG. 3 is an end view.

In FIG. 1 the kiln shell is shown diagrammatically at 1 and has an annular end flange 2 to which one part 3 of a labyrinth seal is fixed. The other part 4 of this seal is fixed to a stationary end structure, part of which is shown, again diagrammatically, at 5. As shown in FIG. 2, the moving part 3 carries concentric rings of teeth 6 which mesh with complementary teeth 7 on the stationary part 4.

The stationary structure includes an end plate 8 which makes close contact with the stationary seal part 4 and which carries a circular plate 9 through spacers 10. This plate 9 lies within a ring 11 which is fixed to the end flange 2 and extends axially across the labyrinth seal.

It will be seen that the plate 8, the parts 3 and 4 of the seal, the ring 11 and the plate 9 together bound a chamber 14, and that the only communication between this chamber and the interior of the kiln is through a small annular gap 12 left between the plate 9 and the ring 11.

An inlet 13 for gas is provided in the plate 8, and in operation gas introduced through this inlet flows into the chamber 14 and through the gap 12 to prevent dust-laden gas from passing into the chamber and so to the neighbourhood of the seal.

The kiln feed is introduced through a chute 15 which passes through openings in the stationary plates 8 and 9, and a pipe 16 similarly passes through the plates 8 and 9 to serve as a gas outlet.

We claim:

1. A rotary kiln having a metal-to-metal seal between the rotary structure and a stationary end structure in which the seal is enclosed in a chamber having moving and stationary walls between which there is an annular gap leading to the interior of the kiln, and means are provided for delivering a stream of gas into the chamber to pass from it into the kiln through the gap, thereby preventing the outward passage of dust-laden gas.

2. A rotary kiln according to claim 1 in which the chamber is bounded by a circular end plate, a circular inner plate carried by the end plate, the seal and a ring carried by the inner plate, the annular gap lying between the ring and the inner plate.

* * * * *

Disclaimer 3,751,199.—*Luke Alexander Toft*, Swansea, Wales. PRESSURE KILN SEAL. Patent dated Aug. 7, 1973. Disclaimer filed Nov. 1, 1977, by the assignee, *The International Nickel Company, Inc.*

Hereby enters this disclaimer to claim 1 of said patent.

[*Official Gazette February 14, 1978.*]